United States Patent
Troiani

(10) Patent No.: US 12,526,339 B2
(45) Date of Patent: Jan. 13, 2026

(54) DATA TRACKING FOR DATA OWNERS

(71) Applicant: Cisco Technology, Inc., San Jose, CA (US)

(72) Inventor: Chiara Troiani, Cheseaux-sur-Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 216 days.

(21) Appl. No.: 17/730,833

(22) Filed: Apr. 27, 2022

(65) Prior Publication Data

US 2023/0353648 A1    Nov. 2, 2023

(51) Int. Cl.
  *H04L 67/50* (2022.01)
  *G06F 16/23* (2019.01)
  *G06F 40/10* (2020.01)
  *H04L 9/40* (2022.01)

(52) U.S. Cl.
  CPC ........ *H04L 67/535* (2022.05); *G06F 16/2379* (2019.01); *G06F 40/10* (2020.01); *H04L 9/40* (2022.05); *H04L 63/04* (2013.01)

(58) Field of Classification Search
  CPC ......... H04L 67/535; H04L 9/40; H04L 63/04; H04L 63/102; G06F 16/2379; G06F 40/10; G06F 16/9538
  See application file for complete search history.

(56) References Cited

U.S. PATENT DOCUMENTS

| | | | | |
|---|---|---|---|---|
| 11,030,207 B1* | 6/2021 | Setlur | ............... | G06F 16/248 |
| 12,229,788 B1* | 2/2025 | Gupta | ............... | G06F 16/2379 |
| 2004/0002988 A1 | 1/2004 | Seshadri et al. | | |
| 2009/0037973 A1* | 2/2009 | Gustave | ............... | G06F 21/6263 726/1 |
| 2013/0185253 A1 | 7/2013 | Mohammed et al. | | |
| 2015/0127829 A1* | 5/2015 | Biswas | ............... | H04L 63/20 709/225 |
| 2017/0024724 A1* | 1/2017 | Kwak | ............... | G06Q 20/34 |
| 2019/0052660 A1* | 2/2019 | Cassidy | ............... | G06F 21/54 |
| 2019/0087845 A1 | 3/2019 | Kohli | | |
| 2019/0251170 A1* | 8/2019 | Chittimalli | ............... | G06F 40/35 |
| 2020/0159777 A1* | 5/2020 | Weldemariam | ............... | G06N 3/04 |
| 2020/0304626 A1 | 9/2020 | Phillips et al. | | |

(Continued)

OTHER PUBLICATIONS

Shivanath et al., "Extracting Primitive Tasks from Procedural Videos using Machine Learning," 2019 International Conference on Communication and Electronics Systems (ICCES) Year: 2019 | Conference Paper | Publisher: IEEE.*

(Continued)

*Primary Examiner* — Roderick Tolentino

(74) *Attorney, Agent, or Firm* — Lee & Hayes, P.C.

(57) ABSTRACT

According to one or more embodiments of the disclosure, a device obtains a data handling agreement associated with a subscription of a user to an online service. The device extracts data handling information for a type of data regarding the user from the data handling agreement by applying natural language processing to the data handling agreement. The device generates contextual data indicative of the type of data regarding the user being reported to the online service. The device provides the data handling information and the contextual data for presentation to the user.

20 Claims, 6 Drawing Sheets

(56) References Cited

U.S. PATENT DOCUMENTS

2022/0147829 A1* 5/2022 Kubota .................. G06N 10/60
2024/0064133 A1* 2/2024 Ahmed .................. H04W 4/60

OTHER PUBLICATIONS

Li et al., "Automated Bug Reproduction from User Reviews for Android Applications," 2020 IEEE/ACM 42nd International Conference on Software Engineering: Software Engineering in Practice (ICSE-SEIP) Year: 2020 | Conference Paper | Publisher: IEEE.*

"Working with Subscriptions", online: https://www.chargebee.com/docs/2.0/subscriptions.html, accessed Apr. 4, 2022, 15 pages, Chargebee Inc.

"Take Control of Your Subscriptions", online: https://www.truebill.com/feature/manage-subscriptions, accessed Apr. 19, 2022, 2 pages, Truebill.

Devlin, et al., "BERT: Pre-training of Deep Bidirectional Transformers for Language Understanding", online: https://arxiv.org/pdf/1810.04805.pdf, May 2019, accessed Apr. 37, 2022, 16 pages, arxiv.org.

"BERT (language model)", online: https://en.wikipedia.org/wiki/BERT_(language_model), Apr. 10, 2022, accessed Apr. 27, 2022, 5 pages, Wikimedia Foundation, Inc.

Bhageria, Deepesh, "Build a Smart Question Answering System with Fine-Tuned BERT", online: https://medium.com/saarthi-ai/build-a-smart-question-answering-system-with-fine-tuned-bert-b586e4cfa5f5, Jun. 4, 2020, accessed Apr. 27, 2022, 11 pages, Medium.

* cited by examiner

DATA TRACKING FOR DATA OWNERS

TECHNICAL FIELD

The present disclosure relates generally to computer networks, and, more particularly, to data tracking for data owners.

BACKGROUND

Users are signing up for more and more online services, both intentionally and inadvertently, through the download of applications, the use of wearable devices, the deployment of home automation, etc. These online services may collect an extensive and diverse array of data about the user, the user's activity, the user's device, etc., for a variety of reasons. In some instances, an online service may utilize its collected data to simply operate and/or improve the online service. However, in other cases, an online service may use its collected data for purposes such as marketing additional goods or services to the user, monetizing the data by selling it to third parties for their own purposes, or the like.

As part of the terms of service for an online service, a user typically agrees to the collection and use of their data. Often, this is done through the use of 'clickwrap' license agreements that require the user to agree to the terms before using the online service. However, few users ever read the full agreement and fewer still are able to recall the full terms to which they agreed. Further, once the user provides consent, the user may have no insight or control as to which entities are using their data, what data is being collected and used, how the data is being used, how often the data is being collected, where the data is being used, etc. Additionally, if the user later wishes to erase their account and have their data purged from the online service, they have no guarantees as to the execution of that request, if even allowed.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
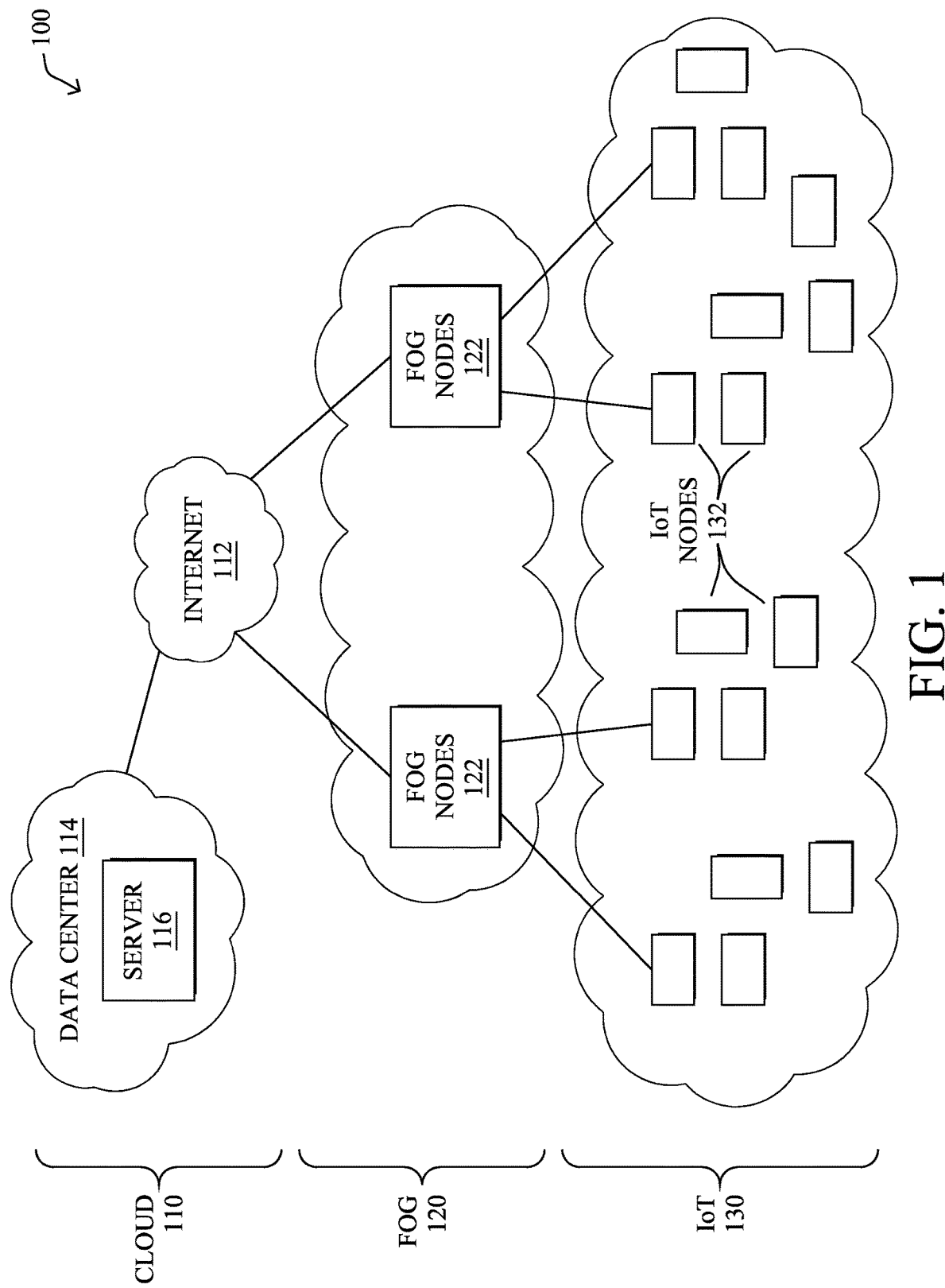
FIG. 1 illustrates an example network.

According to one or more embodiments of the disclosure, a device obtains a data handling agreement associated with a subscription of a user to an online service. The device extracts data handling information for a type of data regarding the user from the data handling agreement by applying natural language processing to the data handling agreement. The device generates contextual data indicative of the type of data regarding the user being reported to the online service. The device provides the data handling information and the contextual data for presentation to the user.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
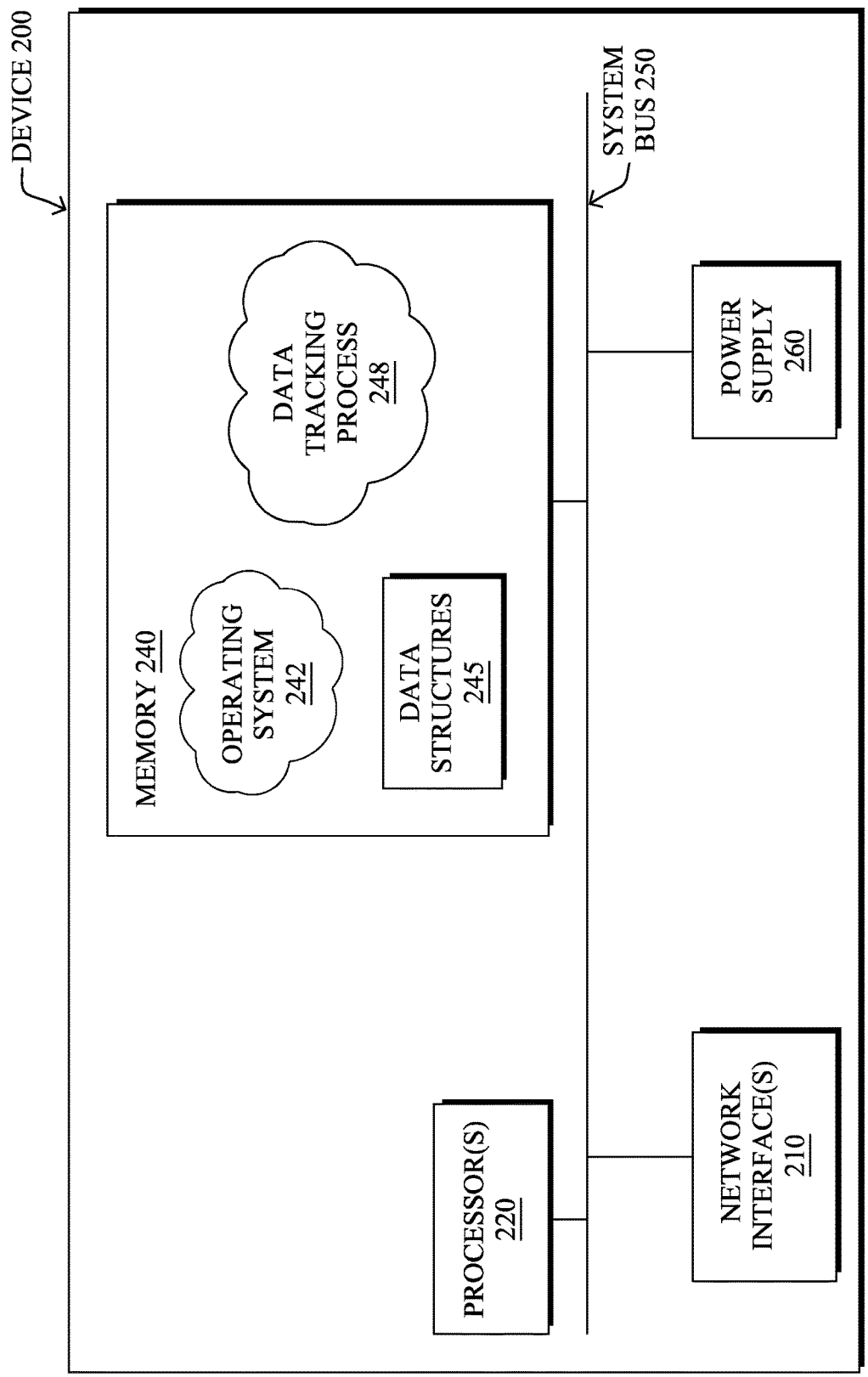
FIG. 2 illustrates an example network device/node.

FIG. 2 is a schematic block diagram of an example node/device 200 (e.g., an apparatus) that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.). In various embodiments, node/device 200 may take the form of a networking device, such as a switch, router, or the like.

Communication interface(s) 210 include the mechanical, electrical, and signaling circuitry for communicating data over a communication link. To this end, communication interface(s) 210 may be configured to transmit and/or receive data using a variety of different communication protocols, such as Ethernet, TCP/IP, UDP, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a data tracking process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
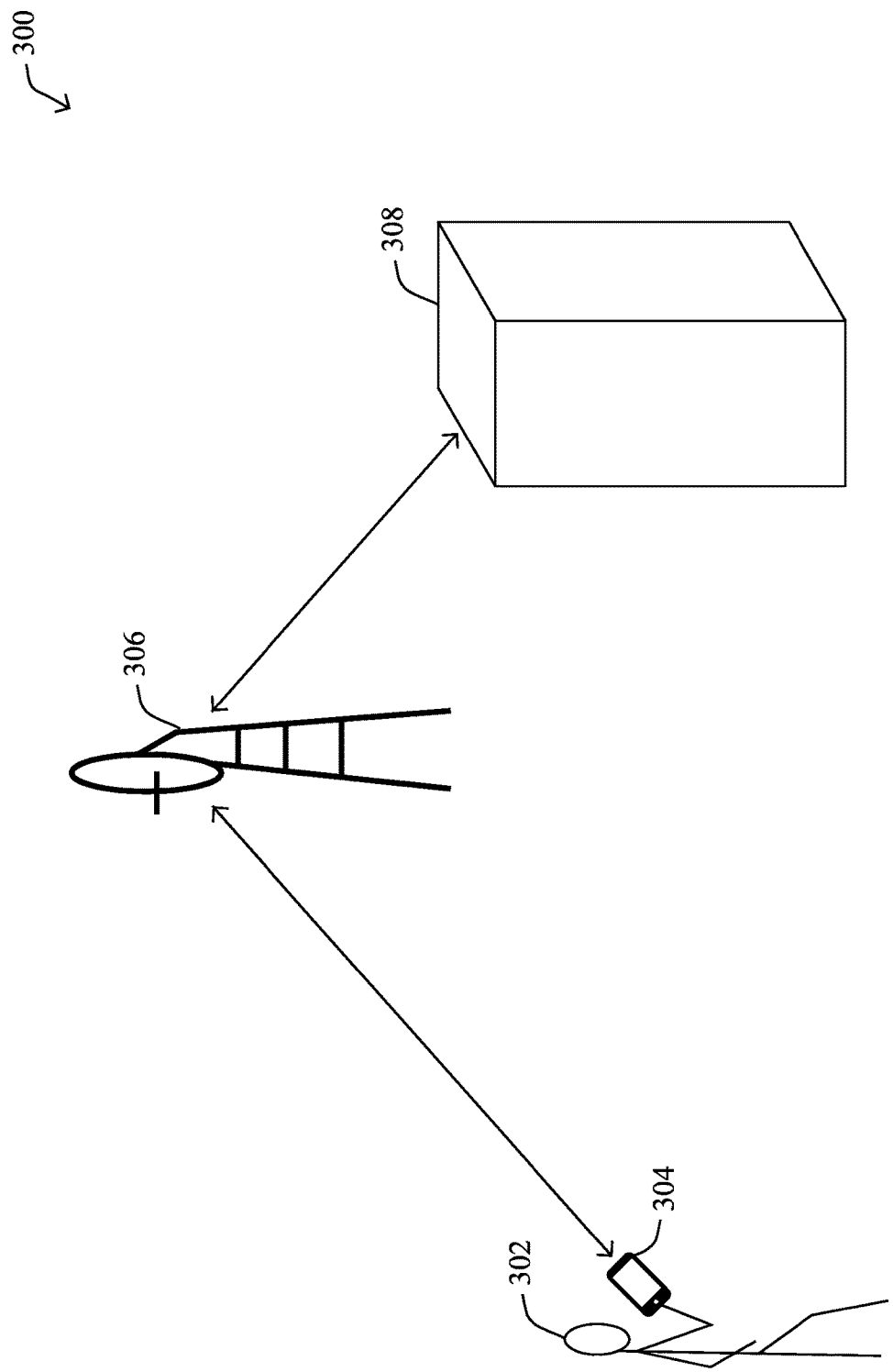
FIG. 3 illustrates an example network for collecting data from a device.

FIG. 3 is a simplified example of a network 300 for collecting data from user device 304 that may be used with one or more embodiments described herein. Specifically, network 300 is a cellular network operable to wirelessly communicate data with a cellular network-enabled device 304 (e.g., a device 200). Device 304 may include a computing device, a smartphone, a tablet computer, a laptop computer, a smart device, an IoT device, etc. It will be apparent to those skilled in the art that device 304 may include any other type of device capable of transmitting data across a network. Additionally, it will be apparent to those skilled in the art that network 300 may include any other type of network (e.g., Internet, Ethernet, Wi-Fi, Bluetooth, etc.) capable of transmitting data (e.g., via wireless means, via wired means, etc.) among devices.

In various instances, network 300 may include a network communication node such as cellular base station 306 or other infrastructure to provide network connectivity to device 304. Cellular base station 306 may include an array of antennas and electronic communications equipment. Cellular base station 306 may send and receive packets of digital information back and forth with device 304 via radio waves. Cellular base station 306 may be communicably coupled to a computer network. For example, cellular base station 306 may be coupled to the Internet.

Device 304 may include instructions executable by a processing component of device 304 to provide user 302 with access to an online service and its associated functionality. For example, the online service may be provided through an application executing on device 304. An online service may include an entity that provides access to various types of data and/or provides a service to user 302 via the Internet or other network connection. For example, an online service may include online banking, education, shopping, news, social media, email, building automation, music streaming, media streaming, virtual assistant, document processing, etc.

An online service may provide its functionality through the exchange of data with device 304 over a network such as network 300. Specifically, the online service may exchange data between a back-end server 308 communicably coupled to network 300. In some cases, back-end server 308 may be owned and/or operated by the online service. Back-end server 308 may be utilized to store the exchanged data.

Device 304 may collect and/or generate data during its operation. The data may be data about and/or concerning user 302. Examples of the data generated by device 304 may include data about user 302, data about the activity of user 302, data about device 304, data about an environment where device 304 is located, identifying data of user 302, sensor data concerning the environment or user 302, etc. As such, some of the data may be considered personal and/or private to user 302. Specific examples of the data may include a user's name, gender, date of birth, contact information, address, location, browsing and search history, purchase history, financial information, health and fitness information, contacts, habits, preferences, employment information, conversations, audio recordings, images, etc.

This data may be communicated from device 304 to back-end server 308 that provides one or more online services. For example, device 304 may transmit data to back-end server 308 of an online service via a cellular base station 306 and/or any other type of network communication node. The online service may process and/or store the user's data at back-end server 308. In some examples, the online service may use the data to provide and/or improve the service they are providing. In further examples, the online service may use the data to identify and offer additional services and/or products to user 302. In addition, the online service may monetize the data by selling and/or otherwise trading the data with third parties and/or using the data for advertising purposes.

In many jurisdictions, user 302 is the initial owner of their own data. Indeed, many states and countries now have laws and regulations that govern the ownership and use of user data, such as personally identifiable information (PII) data, location information, and the like. To this end, an online service, such as the one provided by back-end service 308, may require user 302 to agree to a data handling agreement concern how the service will collect and use the data collected regarding user 302 and/or their device 304. Such a data handling agreement may be a terms-of-service, a privacy policy, a license agreement, a clickwrap agreement, etc., which may be structured as a legal agreement between the online service and the user 302 and specifying how the user's data will be collected, handled, and/or used by the online service or any affiliates of the service.

As noted above, a user may be required to agree to the data handling agreement as part of their subscription to an online service. For example, as part of the terms of service for an online service, a user typically agrees to the collection and use of their data (e.g., by agreeing to clickwrap licensing terms that users click through). Frequently, when subscribing to an online service, a user will not pay attention to the text of the data handling agreement and will simply click through rapidly to subscribe to the service. In addition, a user may quickly forget what is specified in the data handling agreement. Some users may have interest in how their data will be handled but struggle with comprehending the formatting, structure, and dense wording present in some data handling agreements. As such, once consent to the agreement is given some users may have no view or control as to who is really using their data, what data is being collected and used, how the data is being used, how often the data is being collected, where the data is being used, and the like.

This issue may be compounded when a user has multiple subscriptions to multiple online services with distinct data handling agreements. Furthermore, data handling agreements may be subject to updating, which may change any terms that the user was previously familiar with. Additionally, if the user later wishes unsubscribe from an online service and have their shared data purged from the online service, they have no guarantees as to the execution of that request. As a result, users often find themselves in a situation where they have questions or concerns regarding what data their online services are collecting from them, how the online services are collecting the data, and for what purpose the online services are using the data, but the user has no efficient means of exploring the answer.

Data Tracking for Data Owners

The techniques herein allow a data owner (e.g., a user) to track how their data is being collected by any number of online services, as well as how that data is being used. In some aspects, the techniques herein may leverage Natural Language Processing (NLP) to provide the user a better understanding as to how their personal data is being used by an online service. In further aspects, the techniques herein also provide mechanisms that allow a user to opt out of further data collection and potentially with the ability to request retroactive deletion of their data, as well.

Illustratively, the techniques described herein may be performed by hardware, software, and/or firmware, such as in accordance with data tracking process 248, which may include computer executable instructions executed by the processor 220 (or independent processor of interfaces 210) to perform functions relating to the techniques described herein.

Specifically, according to various embodiments, a device obtains a data handling agreement associated with a subscription of a user to an online service. The device extracts data handling information for a type of data regarding the user from the data handling agreement by applying natural language processing to the data handling agreement. The device generates contextual data indicative of the type of data regarding the user being reported to the online service. The device provides the data handling information and the contextual data for presentation to the user.

Figure 4:
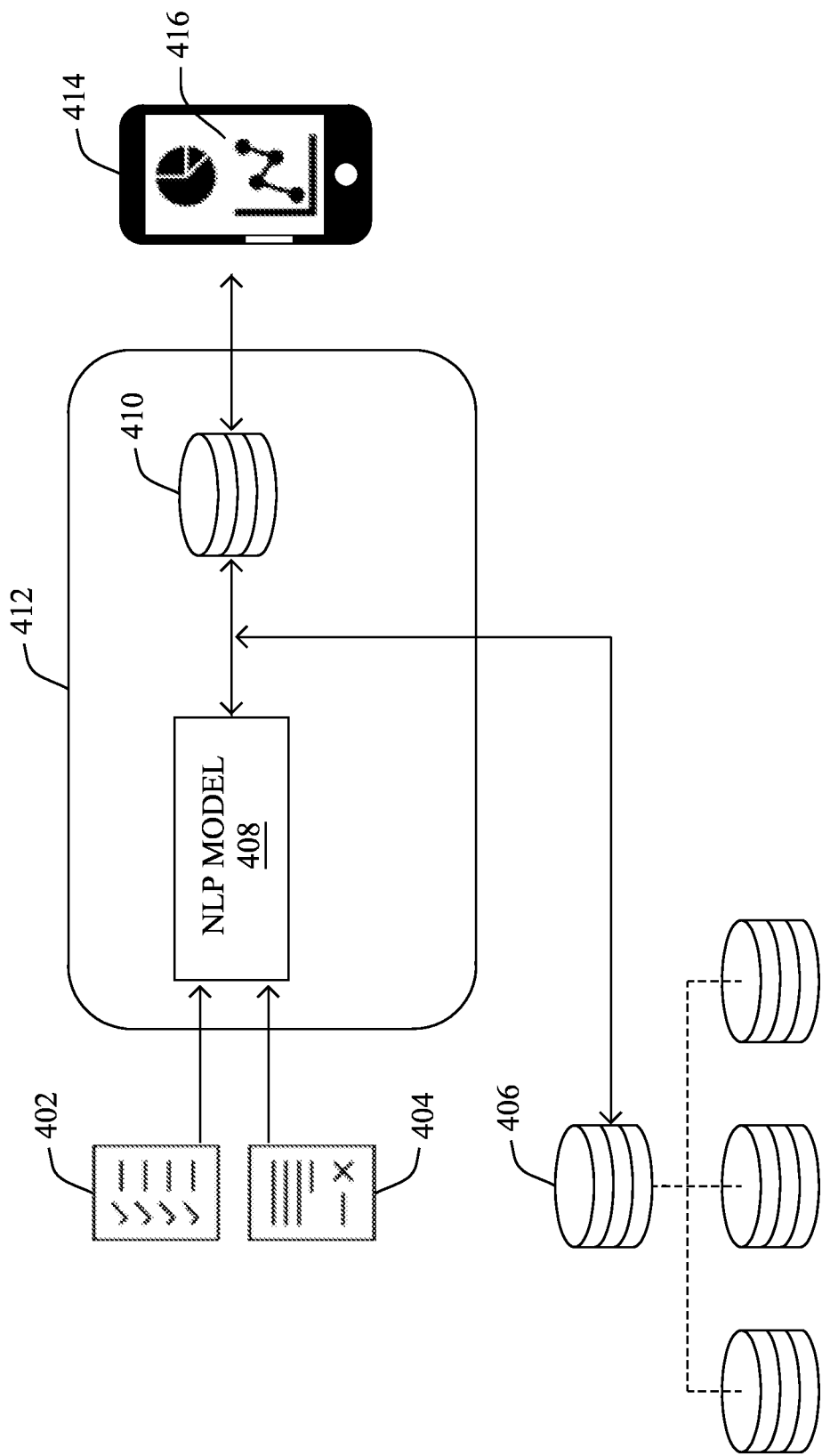
FIG. 4 illustrates an example of the data tracking process.

Operationally, and according to various embodiments, data tracking process 412 illustrated in FIG. 4 may be used to track, manage, and audit which user data is collected by an online service, how it's collected, and how the online service is using the data it collects. In various embodiments, data tracking process 412 may process various data inputs in order to generate a report 416 which may be presented to a user. The report 416 may summarize the handling of their data by the online service in an accessible and transparent way that allows the user to track, manage, and audit the collection and use of their data by an online service.

In various embodiments, data tracking process 412 may obtain data such as user activity data 402. User activity data 402 may include data identifying a new subscription by a user to an online service. For example, user activity data 402 may identify the name of the online service, the type of online service, the source or publisher of the online service, and/or file or log locations on the user device for the online service.

In response to receiving the user activity data 402 indicating a new subscription to an online service, data tracking process 412 may initiate collection and processing of other data associated with the online service. For example, data tracking process 412 may, responsive to detecting a new subscription, begin collecting and processing data inputs such as data handling agreement 404 and contextual data 406, as described in greater detail below. The data collected by data tracking process 412 and the data transformations resulting from processing of that data by data tracking process 412 may be saved to database 410.

In some embodiments, in response to receiving the user activity data 402 indicating a new subscription to an online service, data tracking process 412 may add the new online service subscription to a digital subscription wallet. The digital subscription wallet may include an application executable to aggregate and manage data collection across multiple online service subscriptions, all in one place. Adding the new online service subscription to the digital subscription wallet may include creating a profile for the online service in a digital subscription wallet application. User activity data 402 may then aggregate the data about the new online service in a manner such that it is associated with the created profile and/or accessible to the created profile.

In addition, data tracking process 412 may, responsive to detecting the new subscription, create and/or cause the creation of a digital watermark associated with the user. The watermark may be employed to tag session data exchanged with the online service. The digital watermark may include data embedded into each session data exchanged with the online service that identifies its originator or owner, namely the subscribing user. Some examples of digital watermarks include a user ID, a hash, and/or any other type of embeddable digital information identifying the data as belonging to or originating from the user.

Additionally, the user activity data 402 may include data indicating an un-subscription from an online service has occurred or is requested. For example, user activity data 402 indicating an un-subscription to an online service may trigger data tracking process 412 to stop collecting and/or processing the other data and/or to remove the online service subscription from the digital subscription wallet.

In various embodiments, data tracking process 412 may handle all or part of an un-subscription process in a transparent and auditable manner. For example, user activity data 402 may include an indication that the user wants to un-subscribe from an online service. For instance, user activity data 402 may include a command received from a user, via a digital subscription wallet or other application, indicating that the user wishes to discontinue their subscription to one of the online services being monitored by data tracking process 412. In response, data tracking process 412 may submit a request to the online service on behalf of the user to un-subscribe the user from the online service.

In some embodiments, data tracking process 412 may also include an enforcement mechanism that respects the user's "right to be forgotten," that is, the ability of the user to have their previously collected data deleted. For example, data tracking process 412 may request to the online service that it deletes some of or all the user's data that it has collected. In some instances, this request may be associated with an un-subscription from the online service. In some cases, data tracking process 412 may utilize the digital watermark embedded in the user data to identify the specific user data requested to be deleted. Further, since the user's data is embedded with this digital watermark, its deletion by the online service may be audited by data tracking process 412. For example, data tracking process 312 may confirm that the data was deleted by searching for the watermark in the data retained by the online service. In some examples, data tracking process 312 may request confirmation from the online service provider that their retained data has been audited for the user's data to confirm by watermark that it has all been deleted.

Additionally, data tracking process 412 may obtain data such as data handling agreement 404. Data handling agreement 404 may be a terms-of-service, a privacy policy, a license agreement, a clickwrap agreement, and/or any other agreement between the online service and the user 302 specifying how the user's data will be collected, handled, and/or used by the online service. Data handling agreement 404 may be presented to the user at the time of subscription to an online service. For example, enrollment of the user into the subscription may be contingent upon the user consenting to the data handling agreement 404 at the time of subscription.

Data tracking process 412 may obtain data handling agreement 404 at the time of and/or as part of the subscription process on a user's device. In some cases, data tracking process 412 may obtain data handling agreement 404 directly from the online service provider via a request. Data handling agreement 404 may also be obtained via visiting a website including data handling agreement 404. In further examples, data handling agreement 404 may be obtained from the online service's application installed and/or executing on the user's device. Additionally, data handling agreement 404 may be obtained from communications such as emails or text messages between the online service and the user.

Moreover, a new or update version of a data handling agreement for an existing subscription to an online service may be obtained. For example, via any of the methods described above with respect to obtaining a data handling agreement for a new online service subscription, data tracking process 412 may likewise obtain an updated version of data handling agreement 404.

In various embodiments, obtaining data handling agreement 404 may include obtaining the text of data handling agreement 404. For example, data handling agreement 404 may be obtained, partially or in its entirety, in its natural language format. As such, data handling agreement 404, as obtained, may be the unstructured natural language text of data handling agreement 404. For instance, data handling agreement 404 may be obtained in the same natural language text format as was presented to the user for review at the time of enrollment into the subscription.

Data tracking process 412 may utilize natural language processing (NLP) of data handling agreement 404 to extract data handling information from the data handling agreement 404. Utilizing NLP, data handling agreement 404 may thereby understand the extracted data handling information and/or convert it to a structured data set.

For example, data tracking process 412 may develop and leverage NLP model 408 to process user activity data 402 and/or data handling agreement 404 to extract data handling information about a particular data type and/or particular online service and build an understanding of how that online service is handling a user's data. In some embodiments, data tracking process 412 may utilize NLP model 408 to support a question-answering (QA) functionality of the data tracking process 412 with respect to data handling queries.

According to various embodiments, NLP model 408 may be developed and augmented using transfer learning to learn the text of data handling agreement 404 for each of a user's subscriptions. This may allow data tracking process 412 to answer questions from the user such as "what data is being used by online service X?", "for what purpose is online service X using my data?", etc. Essentially, data tracking process 412 may utilize NLP model 408 to ingest unstructured data, such as the text of data handling agreement 404, and build database 410. As described in greater detail below, the data stored in database 410 may be enriched by contextual data 406.

In various embodiments, NLP model 408 may be developed by data tracking process 412 utilizing pre-training and/or fine-tuning. In some cases, NLP model 408 may be a transformer-based model such as, for example, a bidirectional encoder representations from transformers (BERT) model. Data tracking process 412 may build a keyword dictionary for NLP model 408. The keyword dictionary may be utilizable to select paragraphs related to collected user data from data handling agreement 404. Data tracking process 412 may also build a keyword dictionary utilizable to identify different user data types. For example, the data type keyword dictionary may distinguish between data handling information for different user data types, such as user's name, gender, date of birth, contact information, address, location, browsing and search history, purchase history, financial information, health and fitness information, contacts, habits, preferences, employment information, conversations, audio recordings, images, etc., specified in the data handling agreement 404. This keyword dictionary may also distinguish the relationship of those data types to the data to their corresponding data collection components on a user's device (e.g., location corresponds to GPS coordinate data, audio corresponds to microphone recordings, etc.).

Data tracking process 412 may build a data handling agreement 404 question-answering data set for finetuning NLP model 408. By finetuning NLP model 408, pre-trained for QA on data handling agreement 404, data tracking process 412 may train NLP model 408 to, for a given question and paragraph of text of data handling agreement 404, predict an answer text span in the paragraph. For fine tuning NLP model 408, questions and corresponding paragraphs of data handling agreement 404 could be used as features and labeled accordingly (e.g., start_position, end_position, is_impossible, etc.).

In turn, for each of its managed data handling agreements, data tracking process 412 may perform preprocessing. Preprocessing may include reformatting tables and bullet points of the data handling agreement 404 to normal text. Normal paragraph structure may otherwise be preserved in preprocessing. In addition, pre-processing may include selecting meaningful paragraphs based on the keyword dictionaries. By pruning data handling agreement 404 to meaningful paragraphs corresponding to data handling the search space for generating an answer to a user query may be reduced.

Data tracking process 412 may select a list of meaningful question with respect to data handling for NLP model 408. Sliding windows may be utilized to select a segment of a paragraph of the data handling agreement 404 to be processed by NLP model 408. For example, the sliding windows may be employed in examples, like those employing a BERT-based NLP model 408, which may be limited to transforming a specific amount of tokens at a time (e.g., five hundred twelve tokens).

In various embodiments, NLP model 408 may be utilized to perform a keyword search on the answers (e.g., pre-processed, stop words removed, punctuation, stemming, lowercasing, etc.). The results of the keyword search may be utilized to update a table according to a data type associated with a question and a location within the text, as well as an identity of data handling agreement 404 identifying to which application and/or online service it relates. In some embodiments, the table may be stored to and accessed from database 410. The table may be updated and enriched with contextual data 406, as described in greater detail below.

As part of providing a QA functionality, data tracking process 412 may accept questions from users as inputs. In some examples, the questions may be another example of user activity data 402. The questions may be input to data tracking process 412 as unstructured natural language queries, for example, entered via a search bar of a digital subscription wallet of online service subscriptions. Here, NLP model 408 may be utilized to implement a QA task by taking, as the input, the user question and paragraph as a single packed sequence. The input embeddings may be the sum of the token embeddings and the segment embeddings. As such, the input may be processed before entering NLP model 408. For example, the input may receive token embeddings such as a classifier [CLS] token added to the input word tokens at the beginning of the question and a separation token [SEP] inserted at the end of both the question and the paragraph. Further, the input may receive segment embeddings such as a marker indicating Sentence A or Sentence B being added to each token. These segment embeddings may allow NLP model 408 to distinguish between sentences. For example, all tokens marked as A may belong to the question and all tokens marked as B may belong to the paragraph of the input.

NLP model 408 may be further fine tuned for QA by introducing a start vector and an end vector for processing the input. A probability of each word being the start-word may be calculated by taking a dot product between the final embedding of the word and the start vector, followed by a SoftMax over all the words. The word with the highest resulting probability value will then be considered. A similar process may be followed to find the end-word.

NLP model 408 may then be utilized to understand the user's question, identify and understand portions of data handling agreement 404 relevant to the questions, and structure an answer to the user's question which may include relevant portions of data handling agreement 404. In addition, NLP model 408 may be utilized to understand which contextual data 406 may be utilized to enrich the answer, as described in greater detail below. These understandings and their associated relevant data may be stored in database 410. As previously mentioned, this data may ultimately be incorporated into a report 416 presented to the user to provide the user observability over the collection and usage of their data by the associated online service.

In addition to user activity data 402 and data handling agreement 404, data tracking process 412 may obtain contextual data 406 as an input. Contextual data 406 may include data retrieved from a user's device. In some examples, the user's device may include the subscribing device, which is the device through which the user subscribed to the online service and/or the device through which the user accesses and/or consumes the online service and receives data from and/or communicates data to the online service.

Contextual data 406 may include system settings of the user's device. For example, contextual data 406 may include the permissions given to an online service and/or its application operating on the user's device. In some cases, the permissions may specify which type of data regarding the user has been permitted by the user to be collected from and/or reported to the online service. For instance, the permissions may specify whether the application of the online service is permitted to collect and report data from the microphone, data from the camera, data from the user's contacts, data from the user's data library, data about the user's location, etc. In addition, the permissions may specify the frequency with which the user's data is permitted be reported to the online service. For instance, the permissions may specify whether the application of the online service is permitted to collect and report user data all the time, only when the user is using the application, only after prompting the user for permission within a specified time period, never, etc.

Contextual data 406 may also include location information for the user and/or the user's device. Location information may include the city, metropolitan area, state, territory, country, region, etc. of the user and or the user's device. Further, the location may be the location where the user resides and/or has citizenship. Furthermore, the location may be the location where the user's device is registered. The location may also be the location where the data being reported to the online service is collected. In addition, the location may be the location where the user consented to data handling agreement 404 and/or the jurisdiction under which data handling agreement 404 is structured and/or enforceable. This data may be utilized by data tracking process 412 as an indication of any jurisdictional privacy laws or regulation that may be applicable to the data collection and use by the online service. For example, the data tracking process 412 may utilize a location specified in contextual data 406 to determine that, in one example, the General Data Protection Regulation (GDPR) of the European Union applies or, in another example, that the California Consumer Privacy Act (CCPA) of California applies.

In addition, contextual data 406 may include data about the data flow between the user and the online service. In some cases, contextual data 406 may include logs and statistics about the data actually collected from the user and/or sent to the online service. For example, data tracking process 412 may evaluate system logs on the user's device to obtain contextual data 406 indicating what type of data was collect and/or reported to the online service and/or the timing or frequency of that collection and/or reporting. For instance, a system log may be evaluated and data tracking process 412 may extract historical contextual data 406 indicating that an online service's application is collecting and/or transmitting a user's location every five minutes to an online service.

As previously described, data tracking process 412 may utilize contextual data 406 to enrich a data set including data handling information extracted from data handling agreement 404 utilizing NLP model 408. For example, a table in database 410 including the results of performing a QA task utilizing NLP model 408 may be supplemented to include contextual data 406.

Data tracking process 412 may output a report 416 including data handling information extracted from data handling agreement 404 and its corresponding contextual data 406 to a user. For example, responsive to a request for information from a user, which may be an unstructured natural language query, data tracking process 412 may format the data handling information and its corresponding contextual data 406 into report 416 presented to a user via a user device 414. User device 414 may be the subscriber device or, alternatively, user device 414 may be another device that the user owns or has access to. Report 416 may provide an answer to a user query regarding data handling by an online service with respect to a certain data type and/or all types of data which may be supplemented by data handling information extracted from data handling agreement 404 and its corresponding contextual data 406 in an easy to comprehend simplified presentation. In various embodiments, report 416 may provide a summary view of data collection and usage specific to an online service and/or a particular data type.

In some cases, report 416 may be presented in a digital subscription wallet. For example, say the user is sharing their location with eight applications associated with eight different online services. Data tracking process 412 may present these eight subscriptions to the user in a list form within a digital subscription wallet. Selection of one of the eight subscriptions may cause further presentation of report 416 including data handling information including relevant data handling information extracted from data handling agreement 404 and its corresponding contextual data 406 for the particular selected online service and/or for a particular data type.

Figure 5:
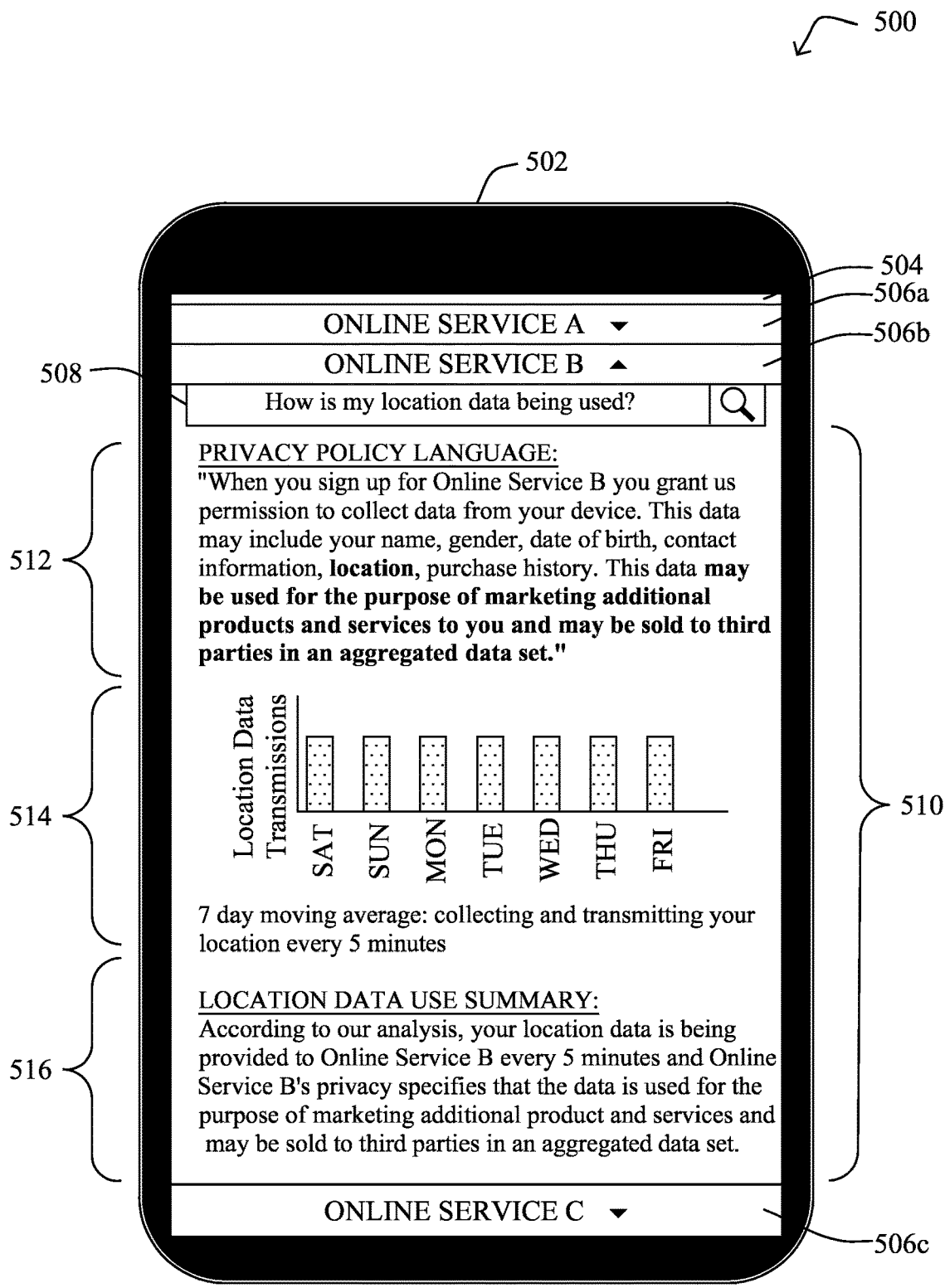
FIG. 5 illustrates an example presentation generated by a data tracking process.

FIG. 5 illustrates an example presentation 500 generated by a data tracking process such as data tracking process 248 and/or data tracking process 412, according to various embodiments. More specifically, FIG. 5 illustrates a user device 502. User device 502 may be the subscribing device (or one of a plurality of subscribing devices) whose data exchange with the online service is being queried. Alternatively, user device 505 may be a different device than the subscribing device.

A simplified example user interface 504 is illustrated being presented on the user device 502. In some examples, the user interface 504 may be a user interface of a digital subscription wallet. User interface 504 may include one or more collapsible and/or expandable sections 506, each one dedicated to a respective one of the user's active online service subscriptions. Each section 506 may be labeled with the name of the corresponding online service for ease of reference of a user interacting with the user interface 504.

In various embodiments, a user may select a section 506b corresponding to an online subscription with respect to which they have a question regarding the handling of their data. In some cases, the user interface 504 may include search bar 508. Search bar 508 may be instantiated within each section 506 to handle queries directed specifically to the data handling of that section's corresponding online service. Alternatively, or additionally, the search bar 508 may be instantiated outside of the sections 506 to accept all data handling queries. Search bar 508 may accept unstructured natural language queries entered by a user such as "How is my location data being used?".

Responsive to the user selecting the section 506b and/or submitting a query, a data tracking process may process the query utilizing an NLP model and may generate a report 510 addressing the query to be presented to the user. Report 510 may be generated by referencing a database and constructing the report from data handling information 512 extracted from data handling agreement utilizing NLP model and contextual data 514 stored on the database.

For example, report 510 may include data handling information 512 reciting a portion of the data handling agreement identified by the NLP model as relevant to the online service and/or data type that is the subject of the query. Additionally, report 510 may include contextual data 514 specifying a flow of the user's data identified as relevant to the online service and/or data type that is the subject of the query. In some examples, the contextual data 514 presented in report 510 may be reformatted as a graphical display of the data such as a chart or graph. Further, the contextual data 514 presented in report 510 may include additional statistical analysis (e.g., a seven-day moving average of location data transmissions, etc.) performed on top of contextual data received as an input to the data tracking process.

Report 510 may include additional information such as data use summary 516. Data use summary 516 may include a synopsis of the data handling information 512 and/or the contextual data 514. In some cases, data use summary 516 may be phrased as a plain language response to a user's specific query.

Although not illustrated in FIG. 5, report 510 may include information such as data agreement update information. For example, report 510 may include an indication to the user that a data handling agreement that was previously in force between the user and the online service provider has been updated. In some cases, report 510 may present the user with a blackline version of the data handling agreement or some other comparison between the prior data handling agreement and the updated version that indicates changes between the two versions.

In additional examples, report 510 may include indications of data sharing laws or regulations that the data tracking process has determined may apply to the data collected and/or used by an online service. Further, report 510 may include potential violations of those data sharing laws or regulations as detected by the data tracking process. For example, report 510 may indicate that GDPR applies to the handling of the user's data by the online service and that a potential violation of the GDPR has been detected by a comparison between the contextual data and the law or regulation. In some examples, an NLP model may be applied to the text of the law or regulation to understand whether the contextual data reveals a violation. Furthermore, report 510 may include a link to a functionality to report the suspected violation, including its supporting data, to a regulating authority.

In some cases, report 510 may include a link to a functionality to unsubscribe from an online service. When selected, the link may cause the data tracking process to instigate a cancellation of the subscription to the selected online service. As part of this cancellation process, the data tracking process may request to the online service that it purges the user's data and provide the online service with a digital watermark to identify all of the user's data to be purged in their system.

Figure 6:
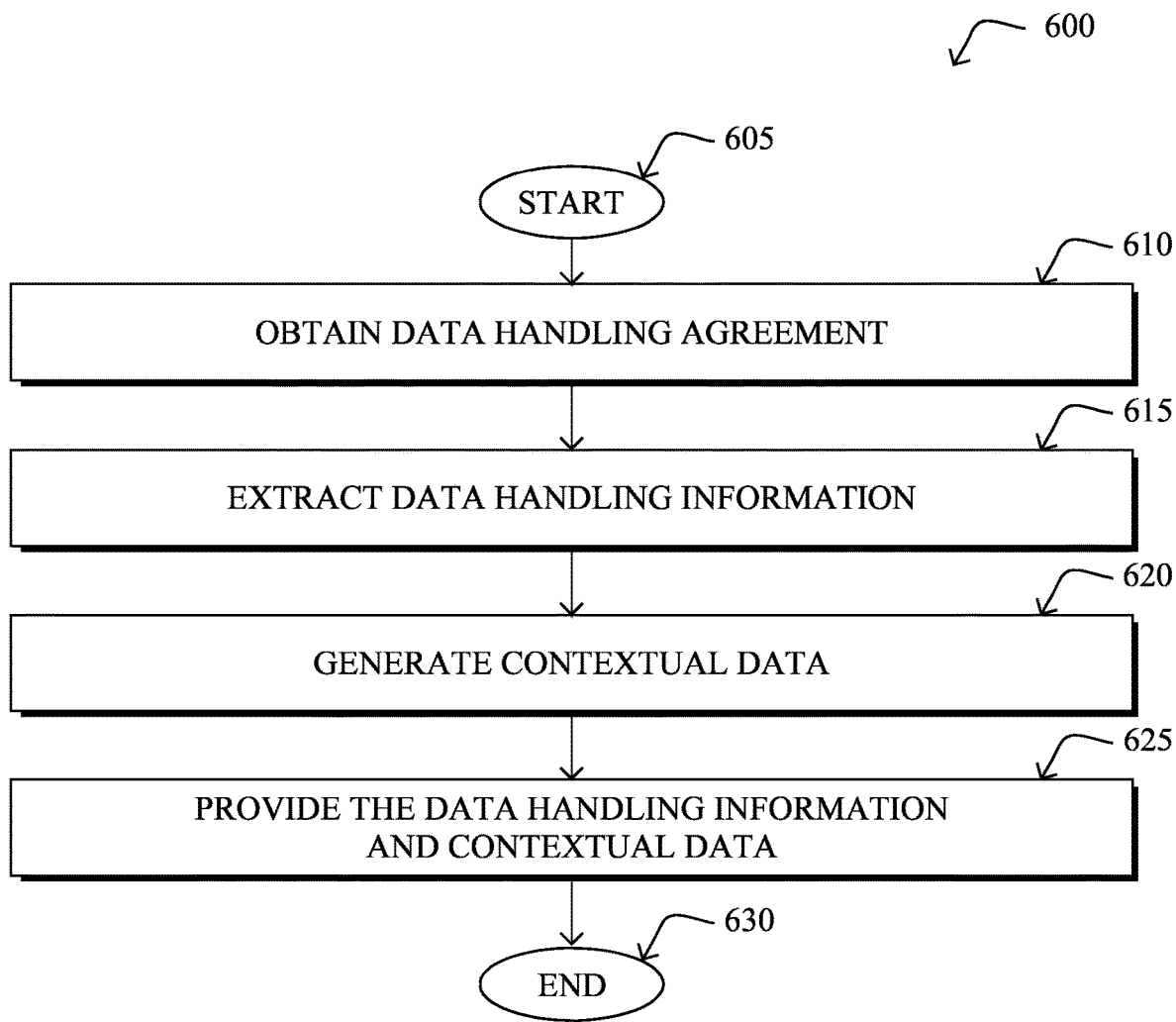
FIG. 6 illustrates an example simplified procedure for data tracking.

FIG. 6 illustrates an example simplified procedure for data tracking for data owners, in accordance with one or more embodiments described herein. In various embodiments, a non-generic, specifically configured networking device (e.g., device 200) may perform procedure 600 by executing stored instructions (e.g., process 248). For instance, a particular networking device, such as an Ethernet switch, etc., may perform procedure 600. The procedure 600 may start at step 605, and continues to step 610, where, as described in greater detail above, where the procedure 600 may include obtaining, by a device, a data handling agreement associated with a subscription of a user to an online service. In some embodiments obtaining the data handling agreement may be performed responsive to detecting an update to the data handling agreement of the online service.

At step 615, as detailed above, the procedure 600 may include extracting, by the device, data handling information for a type of data regarding the user from the data handling agreement by applying natural language processing to the data handling agreement. In various embodiments, a data handling agreement may include at least one of a terms-of-service, a privacy policy, or a license agreement associated with the online service. Further, the type of data may include location information for the user.

At step 620, the procedure 600 may include generating, by the device, contextual data indicative of the type of data regarding the user being reported to the online service. Contextual data may include data indicative of a frequency of the type of data regarding the user being reported to the online service. In some cases, generating the contextual data may include determining whether a system setting allows the type of data regarding the user to be reported to the online service. In further examples, generating the contextual data may include evaluating a system log file indicative of the type of data regarding the user being reported to the online service.

At step 625, as detailed above, the procedure 600 may include providing, by the device, the data handling information and the contextual data for presentation to the user. The data handling information provided for presentation to the user may include one or more sentences of the data handling agreement regarding collection of the type of data. In various embodiments, the data handling information and the contextual data may be presented in conjunction with information regarding a plurality of online subscriptions associated with the user. In some cases, procedure 600 may include instructing the online service to delete the type of data regarding the user reported to the online service. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a mechanism to track, manage, and audit the collection and use of a user's data by one or more online service. The techniques may leverage natural language processing to provide a user with an accessible view of their data handling agreements and how the data subject to those agreements is being handled.

While there have been shown and described illustrative embodiments for data tracking for data owners, it is to be understood that various other adaptations and modifications may be made within the intent and scope of the embodiments herein. For instance, while the techniques herein are primarily described with respect to an Ethernet ring, the techniques herein are not limited as such and can be applied to any form of communication network that uses a ring topology.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
obtaining, by a device, a data handling agreement associated with a subscription of a user to an online service;
extracting, by the device, data handling information for a type of data regarding the user from the data handling agreement by applying natural language processing to the data handling agreement, wherein the natural language processing includes (i) using a transformer-based model that is fine-tuned using labeled data handling agreements and (ii) pruning the data handling agreement to paragraphs corresponding to data handling based on an associated keyword dictionary;
generating, by the device, contextual data indicative of the type of data regarding the user and a user device of the user being reported to the online service, the contextual data further indicative of permissions settings given to the online service regarding the user device;
providing, by the device, an indication of the data handling information and the contextual data for presentation to the user; and
instructing, by the device, the online service to perform one or more enforcement mechanisms for handling the type of data regarding the user reported to the online service.

2. The method as in claim 1, wherein the type of data comprises location information for the user.

3. The method as in claim 1, wherein generating the contextual data indicative of the type of data regarding the user being reported to the online service comprises:
determining whether a system setting allows the type of data regarding the user to be reported to the online service.

4. The method as in claim 1, wherein generating the contextual data indicative of the type of data regarding the user being reported to the online service comprises:
evaluating a system log file indicative of the type of data regarding the user being reported to the online service.

5. The method as in claim 1, wherein a data handling agreement comprises at least one of a terms-of-service, a privacy policy, or a license agreement associated with the online service.

6. The method as in claim 1, wherein instructing the online service to perform one or more enforcement mechanisms comprises:
instructing the online service to delete the type of data regarding the user reported to the online service.

7. The method as in claim 1, wherein the data handling information and the contextual data is presented in conjunction with information regarding a plurality of online subscriptions associated with the user.

8. The method as in claim 1, wherein the contextual data is indicative of a frequency of the type of data regarding the user being reported to the online service.

9. The method as in claim 1, wherein the data handling information provided for presentation to the user comprises one or more sentences of the data handling agreement regarding collection of the type of data.

10. The method as in claim 1, wherein obtaining, by the device, the data handling agreement associated with the subscription of the user to the online service is performed responsive to detecting an update to the data handling agreement of the online service.

11. An apparatus, comprising:
one or more interfaces to communicate with a network of devices;
a processor coupled to the one or more interfaces and configured to execute one or more processes; and
a memory configured to store a process that is executable by the processor, the process when executed configured to:
obtain a data handling agreement associated with a subscription of a user to an online service;
extract data handling information for a type of data regarding the user from the data handling agreement by applying natural language processing to the data handling agreement, wherein the natural language processing includes using (i) using a transformer-based model that is fine-tuned using labeled data handling agreements and (ii) pruning the data handling agreement to paragraphs corresponding to data handling based on an associated keyword dictionary;
generate contextual data indicative of the type of data regarding the user and a user device of the user being reported to the online service, the contextual data further indicative of permissions settings given to the online service regarding the user device;
provide an indication of the data handling information and the contextual data for presentation to the user; and
instruct the online service to perform one or more enforcement mechanisms for handling the type of data regarding the user reported to the online service.

12. The apparatus as in claim 11, wherein the type of data comprises location information for the user.

13. The apparatus as in claim 11, wherein the apparatus generates the contextual data indicative of the type of data regarding the user being reported to the online service by:
determining whether a system setting allows the type of data regarding the user to be reported to the online service.

14. The apparatus as in claim 11, wherein the apparatus generates the contextual data indicative of the type of data regarding the user being reported to the online service by:
evaluating a system log file indicative of the type of data regarding the user being reported to the online service.

15. The apparatus as in claim 11, wherein a data handling agreement comprises at least one of a terms-of-service, a privacy policy, or a license agreement associated with the online service.

16. The apparatus as in claim 11, wherein the process, when executed to instruct the online service to perform one or more enforcement mechanisms, is further configured to:
instruct the online service to delete the type of data regarding the user reported to the online service.

17. The apparatus as in claim 11, wherein the data handling information and the contextual data is presented in conjunction with information regarding a plurality of online subscriptions associated with the user.

18. The apparatus as in claim 11, wherein the contextual data is indicative of a frequency of the type of data regarding the user being reported to the online service.

19. The apparatus as in claim 11, wherein the data handling information provided for presentation to the user comprises one or more sentences of the data handling agreement regarding collection of the type of data.

20. A tangible, non-transitory, computer-readable medium storing program instructions that cause a particular networking device to execute a process comprising:
obtaining, by the particular networking device, a data handling agreement associated with a subscription of a user to an online service;
extracting, by the particular networking device, data handling information for a type of data regarding the user from the data handling agreement by applying natural language processing to the data handling agreement, wherein the natural language processing includes (i) using a transformer-based model that is fine-tuned using labeled data handling agreements and (ii) pruning the data handling agreement to paragraphs corresponding to data handling based on an associated keyword dictionary;
generating, by the particular networking device, contextual data indicative of the type of data regarding the user and a user device of the user being reported to the online service, the contextual data further indicative or permissions settings given to the online service regarding the user device;
providing, by the particular networking device, an indication of the data handling information and the contextual data for presentation to the user; and
instructing, by the particular network device, the online service to perform one or more enforcement mechanisms for handling the type of data regarding the user reported to the online service.

* * * * *